(12) United States Patent
Feier et al.

(10) Patent No.: US 7,973,437 B2
(45) Date of Patent: Jul. 5, 2011

(54) TRANSMISSION UNIT

(75) Inventors: Bernhard Feier, Ligist (AT); Walter Furlan, St. Radegund bei Graz (AT); Martin Kiessner-Haiden, Lebring (AT); Peter Koncic, Graz (AT)

(73) Assignee: MAGNA Powertrain AG & Co KG, Lannach (AT)

( * ) Notice: Subject to any disclaimer, the term of this patent is extended or adjusted under 35 U.S.C. 154(b) by 231 days.

(21) Appl. No.: 12/284,637

(22) Filed: Sep. 23, 2008

(65) Prior Publication Data
US 2009/0078489 A1    Mar. 26, 2009

(30) Foreign Application Priority Data
Sep. 25, 2007 (DE) .................. 10 2007 045 815

(51) Int. Cl.
*H02K 5/04* (2006.01)
*H02K 7/00* (2006.01)
*H02K 29/06* (2006.01)
*B60W 10/10* (2006.01)
*F16H 59/02* (2006.01)

(52) U.S. Cl. ..... 310/64; 310/67 R; 310/68 R; 310/68 B; 310/112; 310/75 R; 180/337

(58) Field of Classification Search .................. 310/64, 310/67 R, 68 R; 180/291
See application file for complete search history.

(56) References Cited

U.S. PATENT DOCUMENTS

| 4,873,881 A | 10/1989 | Edelen et al. |
| 5,068,583 A | 11/1991 | Gresham et al. |
| 5,361,650 A | 11/1994 | Klecker et al. |
| 5,377,111 A * | 12/1994 | Takahashi et al. ............. 701/59 |
| 5,528,139 A | 6/1996 | Oudet et al. |
| 5,709,134 A * | 1/1998 | Ulm ............................ 74/606 R |
| 5,969,445 A * | 10/1999 | Horiuchi et al. ................ 310/64 |
| 6,116,391 A | 9/2000 | Kremmling et al. |
| 6,155,126 A | 12/2000 | Vogt et al. |
| 6,155,948 A * | 12/2000 | Gierer ........................... 475/123 |
| 6,367,344 B1 | 4/2002 | Vogt et al. |
| 7,129,716 B2 | 10/2006 | Schroeder |
| 7,147,094 B2 * | 12/2006 | Wakao et al. ................ 192/84.1 |
| 7,215,115 B2 | 5/2007 | Saito et al. |
| 7,289,892 B2 * | 10/2007 | Isogai et al. .................... 701/29 |
| 2003/0090221 A1 | 5/2003 | Becker et al. |
| 2008/0048535 A1* | 2/2008 | Bi et al. ...................... 310/68 R |

FOREIGN PATENT DOCUMENTS

| DE | 4140320 A1 | 6/1992 |
| DE | 4433826 A1 | 3/1996 |
| DE | 19612337 A1 | 10/1997 |
| DE | 19734023 A1 | 2/1998 |
| DE | 10010636 A1 | 9/2001 |

(Continued)

*Primary Examiner* — Burton Mullins
(74) *Attorney, Agent, or Firm* — Harness, Dickey & Pierce, P.L.C.

(57) ABSTRACT

The invention relates to a transmission for a motor vehicle with a transmission housing, with an electrical actuator for the actuation of the transmission and with an electrical control device for the control of the actuator. The transmission has a heat sink device 24 thermoconductively connected to the device and a heat insulating layer between a housing of the actuator and the heat sink device for the thermal insulation of the actuator housing and of the heat sink device, with the actuator housing being thermoconductively connected to the transmission housing or being part of the transmission housing. The invention furthermore relates to a corresponding actuator unit for a transmission.

27 Claims, 3 Drawing Sheets

FOREIGN PATENT DOCUMENTS

| | | |
|---|---|---|
| DE | 10333651 A1 | 2/2005 |
| EP | 0187117 A2 | 7/1986 |
| EP | 0489940 A1 | 12/1990 |
| EP | 0819869 A2 | 1/1998 |
| EP | 1640204 A2 | 3/2006 |
| JP | 6-039330 U | 5/1994 |
| JP | 7-190803 | 7/1995 |
| JP | 9-287909 | 11/1997 |
| JP | 11-150910 | 6/1999 |
| JP | 11-190606 | 7/1999 |
| JP | 2000-282747 | 10/2000 |
| WO | WO 01/65151 | 9/2001 |

* cited by examiner

TRANSMISSION UNIT

The invention relates to a transmission unit for a motor vehicle with a transmission having a transmission housing, with an electrical actuator for the actuation of the transmission which includes an actuator housing and with an electrical control device for the control of the actuator. The invention furthermore relates to an actuator unit for a transmission unit, wherein the actuator unit has an electrical actuator with an actuator housing for the actuation of a transmission and an electrical control unit for the control of the actuator.

Transmissions for motor vehicles, for example, include the main vehicle transmission which can be made as an automatic transmission or as a manual transmission. The main transmission serves to transfer the driving torque of the engine to the driven wheels at different gear ratios.

Transfer cases are used with all-wheel driven vehicles, for example, to transfer the driving torque to different axles with a different and adjustable distribution. It is possible in this respect, for example, depending on the design of the transfer case, that, in addition to a permanently driven axle (for example the rear axle), a further axle (for example the front axle) can be switched in, depending on the demand. In addition to transfer cases which transfer the driving torque in the longitudinal direction of the vehicle in this manner, transfer cases are used to transfer the driving torque in the transverse direction (torque vectoring).

To bring different gears in the transmission into engagement with one another, for example, or to shift transmission clutches, actuators are used which displace the corresponding components inside the transmission in dependence on the demand or bring them into engagement.

Such an actuator can for example, be an electric motor comprising a rotor, a stator and a shaft. The rotary movement of the output shaft of such an actuator is converted into a linear movement for the displacement of an element of a clutch. In known solutions, an electrical control device is used to control the actuator which converts torque demands into electrical control signals for the actuator to put it into operation or to control its speed. The control device can have different electronic components for this purpose.

The actuator and the transmission can produce waste heat due to their respective movement which can be harmful for the operation of the control device. It is admittedly known to arrange the control device remote from the actuator and the transmission in a so-called stand-alone arrangement. A remotely arranged control unit, however, carries the risk that external electromagnetic interference influences have an unfavorable effect on the then required long cable connections. On the other hand, the signals transmitted over the long cable connections for the control of the electric motor can have an interfering effect on other electronic components in the vehicle, in particular when the signal to be transmitted includes a pulse width modulated signal.

It is the object of the present invention to provide a transmission unit which has a compact structure and high reliability. This object is satisfied by a transmission unit having the features of claim 1. An actuator unit advantageously usable for a transmission unit is the subject matter of claim 14. Dependent claims are directed to preferred embodiments.

A transmission unit in accordance with the invention has a heat sink device which is thermoconductively connected to the control device. A heat insulating layer is provided between the actuator housing and the heat sink device which thermally insulates the actuator housing and the heat sink device from one another. The actuator housing is, on the other hand, thermoconductively connected to the transmission housing or is made as part of the transmission housing.

The waste heat of the actuator and of the transmission itself, which may possibly generates higher temperatures than would be compatible for the electronics of the control device, is dissipated in the arrangement in accordance with the invention via the transmission housing which is metallic as a rule and which already has a sufficiently large heat capacity simply due to its size. The heat sink device which is thermoconductively connected to the control device serves, on the other hand, as a separate heat sink for the control electronics so that two different temperature levels can be realized. It is ensured in this respect by the heat insulating layer between the actuator housing and the heat sink device which is thermoconductively connected to the control device that the heat sink device is effectively shielded from the waste heat of the actuator and of the transmission. The possible heat transfer is in this respect, for example, restricted to connection elements, for example to fastening screws, with which the heat sink device and the actuator housing are optionally mechanically connected to one another.

The heat sink device for the control device can therefore be made small and compact since the heat to be dissipated from the control device is as a rule smaller than the waste heat of the actuator.

The transmission unit in accordance with the invention enables a direct arrangement of the control device at the actuator. A signal transmission from the control device to the actuator via long cables is not necessary, whereby the electromagnetic compatibility is improved. In addition, a compact unit of transmission, actuator and control device is possible which can be delivered and installed as a unit so that the logistics effort and the costs are reduced. Errors which may occur on the wiring, for example, due to the larger number of required plug connections are avoided by the compact unit of transmission, actuator and control device. The result of a possible classification of the transmission and/or of the actuator can be stored directly in the control device since, unlike in a stand-alone arrangement, the control device, the actuator and the transmission form a fixed assembly.

For the optimum dissipation of the waste heat of the actuator to the transmission housing, the actuator housing is preferably made of metal at least in that region in which it is thermoconductively connected to the transmission housing. A particularly preferred embodiment provides that the whole actuator housing is made of metal. It is thereby ensured in a simple manner that the heat generating parts of the actuator, that is e.g. the armature, can transmit the generated heat effectively to the actuator housing which can then in turn effectively transfer it to the transmission housing.

The thermal conductive connection between the actuator housing and the transmission housing can be achieved in a simple manner if both are made of metal and are directly connected to one another.

The heat sink device which is thermoconductively connected to the control device for its cooling advantageously includes a metallic heat sink, preferably a cooling rib plate.

If the control device includes a circuit board at which electronic components or memory elements are, for example, arranged, it is advantageously directly thermoconductively connected to the heat sink device, for example by a metallic mechanical connection and/or by a thermal conductive foil and/or by means of a thermal conductive paste or the like. Particularly heat intensive elements, for example power transistors, can in particular be taken into account in this respect, for example while using a thermal conductive paste.

The heat insulating layer which is provided between the actuator housing and the heat sink device can be made of different heat insulating materials. A cost-effective and simple to manufacture embodiment provides for the heat insulating layer to be made of plastic. It is thus additionally possible that the heat insulating layer is made in an injection molding process, for example, whereby it can be matched ideally to the geometry of the surrounding components and is very flexible in its shape design.

A particularly good thermal insulation effect is achieved if the heat insulating layer is substantially closed along the connection surface between the actuator housing and the heat sink device, with the heat insulating layer only having those openings which are required for the electrical connections of the control device and for the mechanical fastening of the heat sink device.

The heat insulating layer can in particular be made as a cover for the control device which is connected to the heat sink device which is made, for example, as a cooling rib plate, with the control device (for example a circuit board with control elements) being enclosed by the heat sink device and the heat insulating layer made as a cover. The heating insulating layer can in this case simultaneously form a cover for an open region of the actuator housing.

In an advantageous further development, at least parts of the electrical control device are integrated in the heat insulating layer. If the heat insulating layer is made of plastic, these parts of the control device can, for example, be overmolded in an injection molding process. The heat insulating layer simultaneously serves as a carrier device in this manner. In particular if heavy components (for example an electrolytic capacitor to support the operating voltage) are integrated in this manner into the heat insulating layer, the heat insulating layer additionally satisfies an oscillation damping function. It is additionally particularly advantageous if plug pins or other electrical connection elements are integrated into the heat insulating layer and establish the electrical connection to the electric motor of the actuator or to a connector plug.

The heat insulating layer and the actuator housing can be screwed to one another, for example. In this respect, a seal is advantageously provided between the heat insulating layer and the actuator housing and ensures a sealing toward the outside.

The control device can be electrically contacted in a conventional manner via one or more cables. A particularly preferred further development provides that the heat insulating layer has an integrally shaped connector plug for the electrical contacting of the control device. The total unit of actuator and control unit can then be contacted by a single plug after the installation.

If the actuator housing is open in the region in which it faces in the direction of the control unit, it is particularly advantageous if the heat insulating layer has a tub-like section in this region. This tub-like section acts as an oil collection tub, in particular in a case when very small amounts of lubricant move from the inner space of the transmission along the actuator shaft into the region of the actuator. Such an embodiment can in particular be realized in a simple manner if the heat insulating layer is manufactured in a plastic injection molding process.

In such an embodiment, optionally, electrical line feeds can additionally be led from the control unit to the actuator through a region of the heat insulating layer which is not located in the tub-like section. It is additionally effectively prevented in this manner that e.g. oil spreads out of the transmission along the line feeds up to the control device.

In particular when the actuator is made as an electric motor, an angular position sensor is as a rule associated with it to be able to monitor and/or regulate the actuator movement. If the DC motor is e.g. a brushless motor (BLDC motor), the angular position sensor can additionally be used for the commuting of the motor.

As an angular position sensor, the rotor of the electric motor e.g. includes a plurality of sensor permanent magnets at a co-rotating sensor pole wheel whose positions can be detected via one or more magnetic field sensors. Hall sensors can e.g. be used as magnetic field sensors. In another embodiment, an individual sensor chip (rotary position sensor) with a Hall sensor integrated thereon is provided.

The Hall sensors or the sensor chip can be arranged in the control device, for example on a corresponding circuit board. In a particularly preferred aspect of the transmission unit in accordance with the invention, provision is made in this respect that the Hall sensors or the sensor chip are/is located in the control device or on an associated circuit board at a location at which a closed section of the heat insulating layer is disposed between the Hall sensors or the sensor chip and the sensor permanent magnets. Such an embodiment ensures that the Hall sensors or the sensor chip cannot come into contact with transmission lubricant which, for example, leaks from the inner space of the transmission along the actuator shaft. The desired position detection of the motor of the actuator is therefore ensured with a simultaneous sealing with respect to the transmission lubricant.

A particularly preferred further development of the transmission unit in accordance with the invention provides that the control device has a memory unit for the storage of data on a classification of the transmission and/or of the actuator. A classification includes the correction of, for example, a transmission characteristic or an actuator characteristic stored in software to the real characteristic which is e.g. measured in a test station at the end of the production process. So that namely a demand on the transmission can be correctly implemented by the control unit, the control device must be exactly informed of the transmission or actuator with which it cooperates. The transmission and/or the actuator can be classified according to different tolerance classes by calibration measurements ex works. Known solutions provide for this purpose, for example, that different electrical resistances are provided at the actuator which are measured by a remote control unit to know the transmission/actuator classification. DE 103 33 651 A1, for example, provides encoding plugs which are connected between the control unit and the actuator for the transmission to ensure a corresponding matching of the control device to the respective present transmission. In the preferred further development of the transmission unit in accordance with the invention, in which the control device itself has a memory unit, such measures are not necessary since the classification can be stored directly in the control unit. The direct arrangement of the control device at the actuator is possible by the effective cooling of the control device by the heat sink device and, on the other hand, by the improved thermal shielding with respect to the waste heat of the actuator and of the transmission so that the risk of possible transmission errors with respect to the classification is reduced.

The arrangement in accordance with the invention with a heat sink device for the control device, with a heat insulating layer between the actuator housing and the heat sink device and with a thermal conductive connection between the actuator housing and the transmission housing can generally be used with all kinds of transmissions. However, such a transmission unit in accordance with the invention in which the transmission includes a transfer case for the transfer of the driving torque in the longitudinal direction (between the front axle and the rear axle) or in the transverse direction (differential transmission) is particularly advantageous. Particularly with such transmission units which are provided in addition to the main vehicle transmission, the compact structure is of particular advantage.

The invention also relates to an actuator unit for use with a transmission unit of the kind explained above. The actuator unit in accordance with the invention is characterized by a heat sink device which is thermoconductively connected to the control device and by a heat insulating layer between the actuator housing and the heat sink device for the mutual thermal insulation of the actuator housing and the heat sink device.

The advantages of an actuator unit in accordance with the invention, in particular of the heat sink device which is thermoconductively connected to the control device, and of the heat insulating layer provided between the actuator housing and the heat sink device result in an analog manner from the above description of the advantages of a transmission unit in accordance with the invention. Particularly preferred aspects of the actuator unit in accordance with the invention and their advantages result in an analog manner from the special embodiments of the transmission unit in accordance with the invention described above.

To dissipate the waste heat of the actuator effectively without thereby putting any strain on the heat sink device of the control device, a connection device is advantageously provided for the connection of the actuator housing to the housing of the transmission which is made thermal conductive, that is, for example, for the realization of a metal-to-metal connection. The actuator housing can in particular be made of metal for this purpose.

The invention will be explained in the following by way of example with reference to the Figures which show embodiments in accordance with the invention. There are shown FIG. 1 a lateral plan view of an actuator unit in accordance with the invention.

Figure 1:
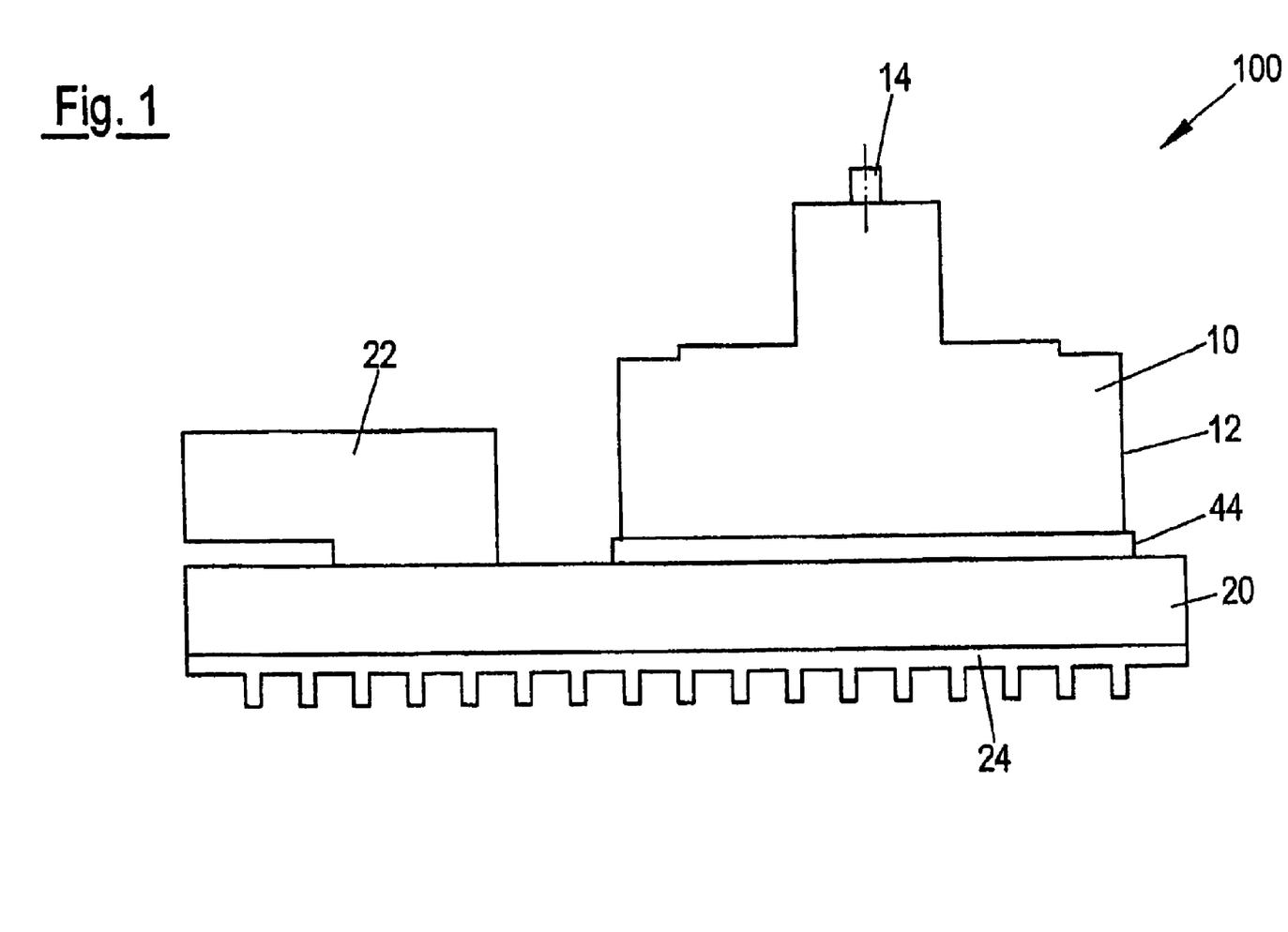

FIG. 1 shows as an overview a lateral plan view of an actuator unit 100 in accordance with the invention. The actuator 10 includes a metallic actuator housing 12 which includes an electric motor which is not visible in FIG. 1 and which has a rotor and a stator in a manner known per se. The rotor drives the output shaft 14 which can, for example, be made as a dihedron and serves for the actuation of a transmission to which the actuator housing 12 is fixedly flanged in a manner not shown.

The actuator housing 12 is seated, sealed by a seal 43 (FIG. 2), in a nose 44 of an injection molded plastic part 20 which serves as a heat insulating layer and blocks the waste heat of the actuator 10 from a control device arranged beneath the heat insulating layer in the Figure and not visible in FIG. 1.

The plastic housing of a connector plug 22 is integrally shaped at this heat insulating layer 20.

A metallic cooling rib plate 24 which is thermoconductively connected to the control device not visible in FIG. 1 is located on the side of the heat insulating layer 20 remote from the actuator 10.

The cooling ribs of the cooling rib plate 24 serve, on the one hand, to dissipate heat ideally and, on the other hand, the mechanical stability for the damping of vibrations can be increased by the design of the shape of the cooling ribs to reduce the danger for components and plug connectors.

Figure 2:
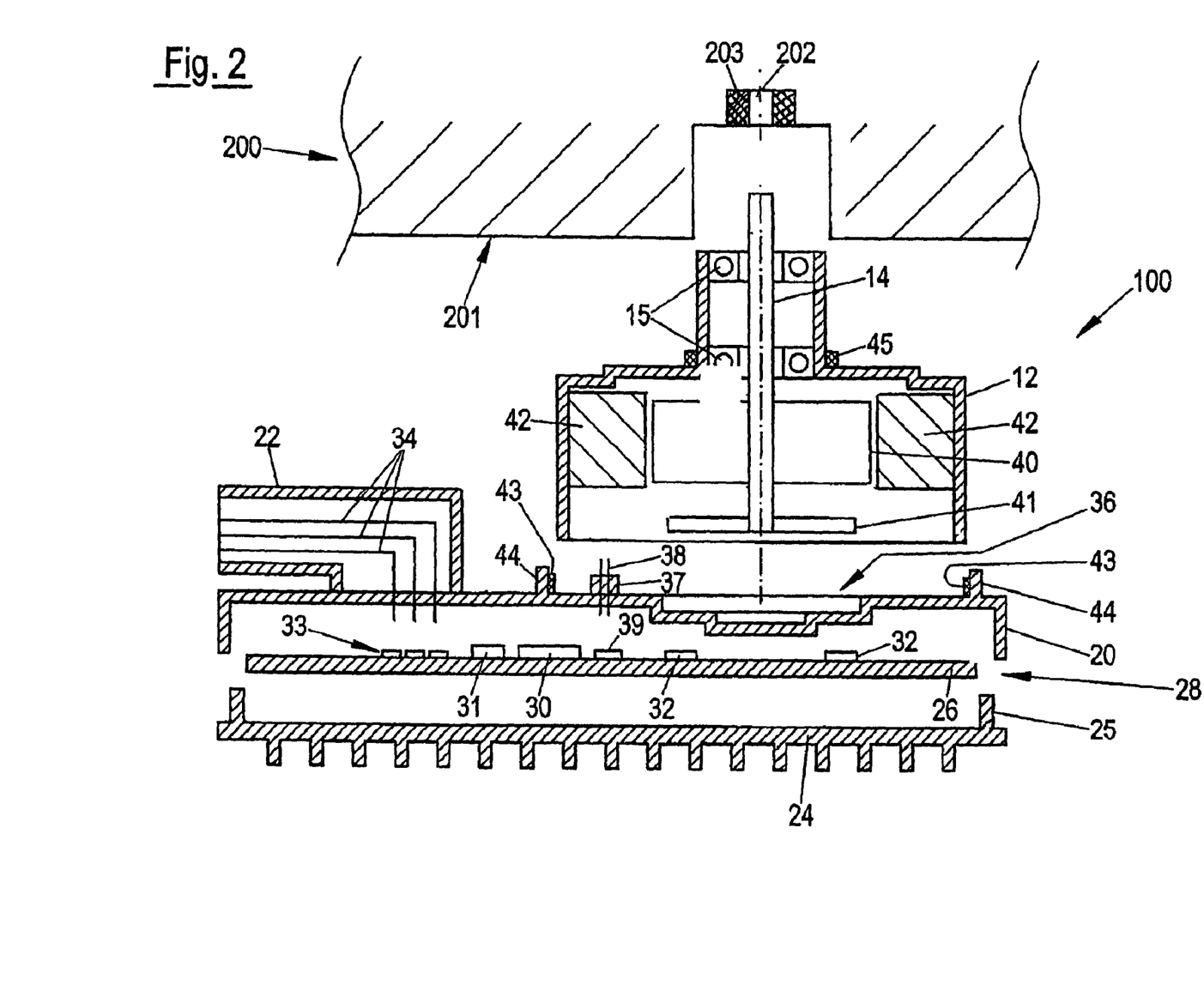
FIG. 2 a lateral sectional view of an actuator unit in accordance with the invention, with individual elements being shown spaced apart from one another.

In FIG. 2, the unit 100 is shown in a lateral sectional view, with the individual elements being drawn spaced apart from one another and in greater detail.

The circuit board 26 of the control device 28 is placed into the peripheral projection 25 of the cooling rib plate 24 and is thermoconductively connected thereto by areal contact. Electrical components 30, 31, required for the control of the actuator 10 are located at the circuit board 26 and are only shown by way of example and schematically here. A memory device 30 is in particular provided in which classification data of the actuator and/or of the transmission connected thereto are stored. The memory unit can e.g. be an EEPROM element. In another embodiment not shown here, the memory unit is located at the lower side of the circuit board.

In addition, three Hall sensors 32 are provided at the circuit board 26 and can evaluate the position of the actuator in a manner still to be described. In another embodiment not shown here, no three Hall sensors 32 are provided, but rather a sensor chip in which Hall sensors are integrated (rotary position sensor).

The thermal coupling of the control device 28 to the cooling rib plate 24 is realized e.g. with the help of thermal conductive foil or thermal conductive paste.

In this respect, heat generating components, that is e.g. power semiconductors such as field effect transistors 31, can be taken into particular account, for which purpose a particularly good heat conductivity can be effected in their region e.g. by corresponding positioning of thermal conductive paste, which is not shown in the only schematic Figures.

The circuit board 26 of the control device 28 is covered by the plastic heat insulating layer 20 which is shaped in the form of a cover. Electrical connectors 34 are molded into the heat insulating layer 20 and can be contacted from the outside via the connector plugs 22 to provide a voltage supply, for example, and to transfer control signals. In the installed state, the connectors 34 are in contact with the contact surfaces 33 on the circuit board 26 which are in electrical contact with the corresponding components 30, 31, 32 on the circuit board.

In the region of the actuator housing 12, which is downwardly open, a tub-shaped recess 36 is located in the heat insulating layer 20.

The power signals generated by the control device 28 are transmitted to the actuator 10 via the power connectors 38 which are embedded in a nose 37 of the heat insulating layer 20, said nose e.g. being co-produced during the injection molding process for the manufacture of the heat insulating plastic layer 20 such that the power connectors 38 are overmolded. The rotor 40 and the stator 42 of an electric motor for the drive of the output shaft 14 are located in a manner known per se in the actuator housing 12, with the remaining elements of the electric motor not being shown for reasons of clarity in FIG. 2. The output shaft 14 is rotatably journaled in the actuator housing 12 via rotor bearings 15. A co-rotating sensor pole wheel 41 is arranged beneath the rotor and includes sensor permanent magnets whose movement can be detected with the Hall sensors 32.

The transmission 200 with a metallic transmission housing 201 is shown only schematically in FIG. 2. The output shaft 14 of the actuator 10 can be connected in a manner known per se to the transmission through the output shaft feedthrough 202 to actuate the transmission. In the exploded representation of FIG. 2, the transmission is indicated separately from the actuator housing. In actual use, the actuator housing 12 is directly flanged to the housing 201 of the transmission 200 and is sealed by the seal 45. The seal 45 made as an O ring provides the seal toward the outside. To ensure that no oil can penetrate from the transmission 200 into the integrated actuator 10, a radial shaft seal 203 is located in the output shaft feedthrough 202.

It is ensured by the metallic housing 12 of the actuator 10 and by the metallic housing 201 of the transmission 200 that an ideal heat transfer can take place via the metal-to-metal contact to dissipate the waste heat of the actuator to the transmission housing 201.

Figure 3:
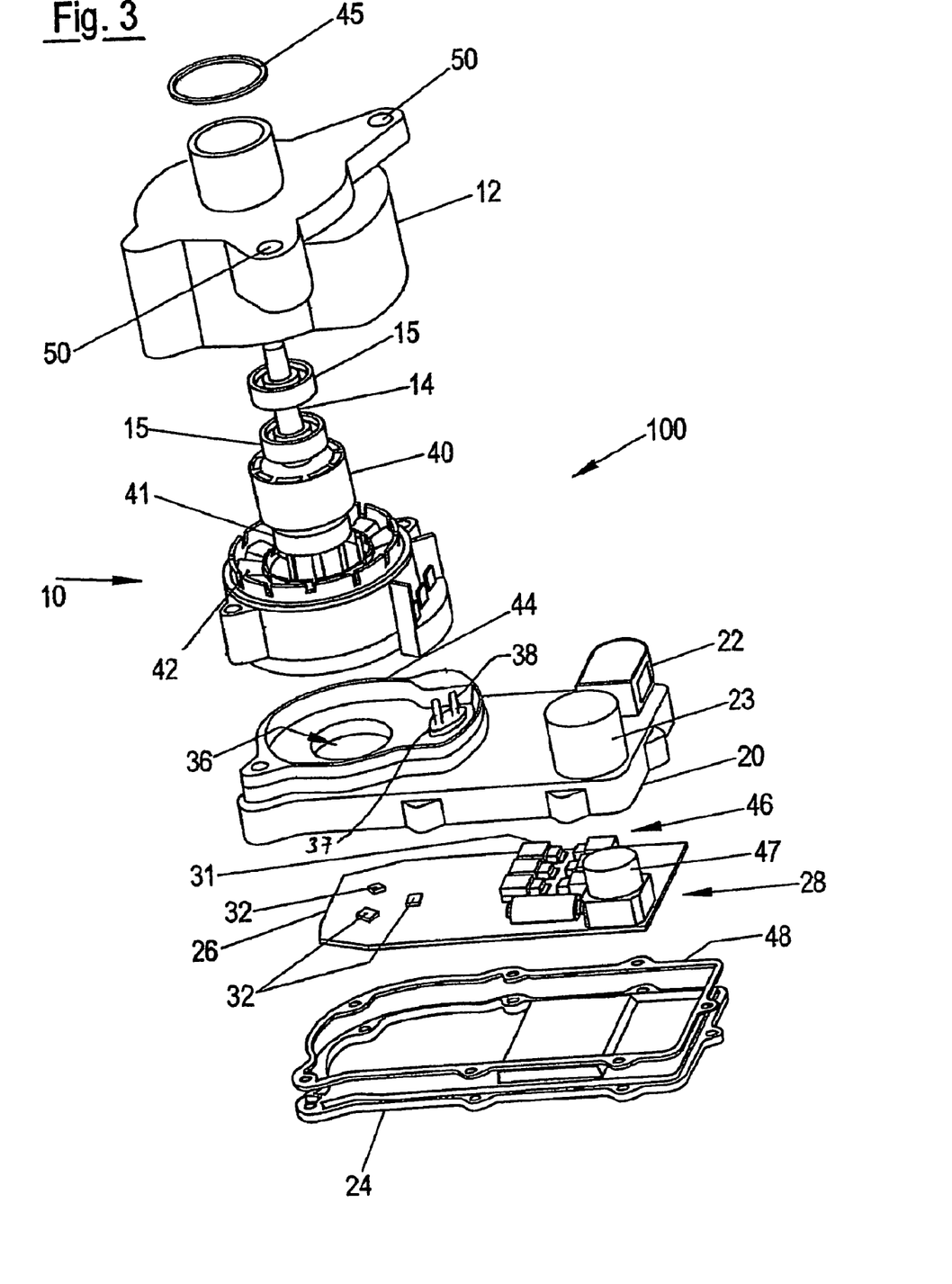
FIG. 3 a perspective exploded drawing of an actuator unit in accordance with the invention.

FIG. 3 shows an actuator unit 100 in a perspective exploded drawing. The same elements as in FIG. 1 or 2 or elements having the same purpose as in FIG. 1 or 2 are also marked by the same reference numerals as in FIG. 1 or 2.

The actuator 10 provided in the actuator housing 12 can in particular be recognized in greater detail in FIG. 3. The rotor 40 which comprises a permanent magnet and which runs in the stationary coils of the stator 42 is located at the output shaft 14.

In addition, the nose 44 at the heat insulating layer 20 can easily be recognized in FIG. 3 and the actuator housing 12 is located in said nose. The seal 43 provided in the nose 44 between the actuator housing 12 and the heat insulating layer 20 is not shown in FIG. 3. The tub-shaped recess 36 in the heat insulating layer 20 is located in the region of the actuator housing 12 within this nose 44.

The Hall sensors 32 and other electrical and electronic elements 46, which in particular also include the power semiconductors 31, can be recognized on the circuit board 26. In addition, an electrolytic capacitor 47 for the support of the operating voltage is provided on the circuit board 26. In the embodiment shown in FIG. 3, a separate mount 23 is provided in the heat insulating layer 20 for this large and relatively heavy component so that the electrolytic capacitor 47 is received and integrated in the heat insulating layer 20. In this manner, the heat insulating layer 20 can additionally satisfy an oscillation damping function.

In an embodiment which is not shown, individual components of the control device 28, for example the electrolytic capacitor 47, is molded directly in the heat insulating layer 20, whereby the additional carrier function and the function of the oscillation damping of the heat insulating layer 20 is improved. The contact between the molded in components and the circuit board 26 can take place in a similar manner to the contact between the connectors 34 of the plug 22 and the contact surfaces 33 of the circuit board.

Finally, an optional sealing element is marked by the reference numeral 48 with which the cooling rib plate 24 contacts the heat insulating layer 20.

As already explained with respect to FIG. 2, the actuator housing 12 is flanged to the transmission housing 201 not shown in FIG. 3, with a sealing connection being ensured by the seal 45.

The actuator unit 100 is installed and used as follows.

The actuator housing 12 with the actuator 10 located therein is inserted into the nose 44 at the heat insulating layer 20. Subsequently, the control device 28 is placed completely into the heat insulating layer 20 from below. In this respect, the power connectors 38 and the connectors 34 in the connector plug 22 come into contact with correspondingly arranged contact surfaces 33, 39 on the circuit board 26 of the control device 28 to provide electrical connections. The cooling rib plate 24 is then screwed to the actuator housing 12 with the help of fastening screws which are not shown. In this manner, a compact unit arises, with the heat insulating layer 20 being captured between the actuator housing 12 and the cooling rib plate 24 and the control device 28 in turn being held between the heat insulating layer 20 and the cooling rib plate 24. The actuator unit 100 formed in this manner is then fastened to the metallic housing 201 of the transmission 200 which should be actuated with the help of the actuator 10. The fastening takes place, for example, by a screw connection via the screw eyelets 50 which are provided at the actuator housing 12 (FIG. 3). In this manner, the metallic actuator housing 12 comes into a fixed areal connection with the metallic transmission housing 201. The actuator unit 100 described in detail forms, together with the transmission 200 flanged on, a transmission unit in accordance with the invention, with classification data on the actuator 10 and/or on the transmission 200 being able to be stored directly in the memory device 30 of the control device 28.

During operation, the cooling of the control device 28 is ensured by the cooling rib plate 24. The waste heat of the actuator 10 is, however, not dissipated via the cooling rib plate 24, since it is thermally almost completely insulated from the control device 28 and the cooling rib plate 24 by the heat insulating layer 20. The heat flow between the actuator 10 or the actuator housing 12, on the one hand, and the cooling rib plate 24, on the other hand, is limited to the aforesaid fastening screws with which the cooling rib plate 24 is fastened to the actuator housing 12.

The waste heat of the actuator 10 is effectively dissipated, on the other hand, via the metallic actuator housing 12 to the metallic transmission housing 201 to which the actuator housing 12 is directly flanged.

In particular when the shown embodiment is obstructed in the spatial orientation shown in the Figures, transmission lubricant which, as the case may be, moves along the actuator shaft 14 into the actuator despite the radial shaft seal 203 cannot penetrate up to the control device 28 since it is captured in the tub-like recess 36 of the heat insulating layer 20. It is in particular kept away from the Hall sensors 32 which serve in cooperation with the sensor permanent magnets for the angular position determination of the rotor 40 of the actuator.

A high positioning precision of the actuator 10 is ensured by the spatial proximity of the control device 28, with in particular no long cable harness connections being necessary between the control device 28 and the actuator 10.

REFERENCE NUMERAL LIST 10 actuator
12 actuator housing
14 output shaft
15 rotor bearing
20 heat insulating layer
22 connector plug
23 mount
24 cooling rib plate
25 projection
26 circuit board
28 control device
30 memory
31 power semiconductor
32 Hall sensors
33 contact surface
34 connectors
36 tub-like recess
37 nose
38 power connectors
39 contact surface
40 rotor of the actuator
41 sensor pole wheel
42 stator of the actuator 43 sealing ring
44 nose
45 seal
46 electronic elements and memory elements
47 electrolytic capacitor
48 seal
50 screw eyelet
100 actuator unit
200 transmission
201 transmission housing
202 output shaft feedthrough
203 radial shaft sealing ring

The invention claimed is:

1. A transmission unit for a motor vehicle, comprising:
a transmission having a transmission housing;
an electric actuator for the actuation of the transmission including an actuator housing;
an electrical control device for the control of the actuator;
a heat sink device thermoconductively connected to the control device;
a heat insulating layer positioned between the actuator housing and the heat sink device for the thermal insulation of the heat sink device from the actuator housing, the actuator housing being thermoconductively connected to the transmission housing, the control device including a memory unit for the storage of data relating to a classification of one of the transmission and the actuator; and
a seal between the heat insulating layer and the actuator housing.

2. A transmission unit for a motor vehicle, comprising:
a transmission having a transmission housing;
an electric actuator for the actuation of the transmission including an actuator housing;
an electrical control device for the control of the actuator;
a heat sink device thermoconductively connected to the control device;
a heat insulating layer positioned between the actuator housing and the heat sink device for the thermal insulation of the heat sink device from the actuator housing, the actuator housing being thermoconductively connected to the transmission housing, the control device including a memory unit for the storage of data relating to a classification of one of the transmission and the actuator; and
a connector plug integrally formed with the heat insulating layer.

3. A transmission unit for a motor vehicle, comprising:
a transmission having a transmission housing;
an electric actuator for the actuation of the transmission including an actuator housing;
an electrical control device for the control of the actuator;
a heat sink device thermoconductively connected to the control device; and
a heat insulating layer positioned between the actuator housing and the heat sink device for the thermal insulation of the heat sink device from the actuator housing, the actuator housing being thermoconductively connected to the transmission housing, the control device including a memory unit for the storage of data relating to a classification of one of the transmission and the actuator;
wherein the actuator housing is open in the direction of the heat insulating layer and the heat insulating layer has a tub-like section in a region facing the open actuator housing.

4. A transmission unit for a motor vehicle, comprising:
a transmission having a transmission housing;
an electric actuator for the actuation of the transmission including an actuator housing;
an electrical control device for the control of the actuator;
a heat sink device thermoconductively connected to the control device; and
a heat insulating layer positioned between the actuator housing and the heat sink device for the thermal insulation of the heat sink device from the actuator housing, the actuator housing being thermoconductively connected to the transmission housing, the control device including a memory unit for the storage of data relating to a classification of one of the transmission and the actuator;
wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

5. A transmission unit in accordance with claim 1, further a connector plug integrally formed with the heat insulating layer.

6. A transmission unit in accordance with claim 5, wherein the actuator housing is open in the direction of the heat insulating layer and the heat insulating layer has a tub-like section in a region facing the open actuator housing.

7. A transmission unit in accordance with claim 6, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

8. A transmission unit in accordance with claim 5, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

9. A transmission unit in accordance with claim 1, wherein the actuator housing is open in the direction of the heat insulating layer and the heat insulating layer has a tub-like section in a region facing the open actuator housing.

10. A transmission unit in accordance with claim 9, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

11. A transmission unit in accordance with claim 1, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

12. A transmission unit in accordance with claim 1, wherein the heat sink device includes a metallic plate including cooling ribs.

13. A transmission unit in accordance with claim 1, wherein the control device includes a circuit board thermoconductively connected to the heat sink device.

14. A transmission unit in accordance with claim 1, wherein the heat insulating layer is made of plastic.

15. A transmission unit in accordance with claim 2, wherein the actuator housing is open in the direction of the heat insulating layer and the heat insulating layer has a tub-like section in a region facing the open actuator housing.

16. A transmission unit in accordance with claim 15, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

17. A transmission unit in accordance with claim 2, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

18. A transmission unit in accordance with claim 2, wherein the heat sink device includes a metallic plate including cooling ribs.

19. A transmission unit in accordance with claim 2, wherein the control device includes a circuit board thermoconductively connected to the heat sink device.

20. A transmission unit in accordance with claim 2, wherein the heat insulating layer is made of plastic.

21. A transmission unit in accordance with claim 3, wherein the actuator includes an electric motor and an angular position sensor associated with the actuator at least one permanent magnet being provided at a rotor of the electric motor, the control device having at least one magnetic field sensor for the detection of the position of the permanent magnet, a section of the heat insulating layer being located between the permanent magnet of the rotor and the at least one magnetic field sensor.

22. A transmission unit in accordance with claim 3, wherein the heat sink device includes a metallic plate including cooling ribs.

23. A transmission unit in accordance with claim 3, wherein the control device includes a circuit board thermoconductively connected to the heat sink device.

24. A transmission unit in accordance with claim 3, wherein the heat insulating layer is made of plastic.

25. A transmission unit in accordance with claim 4, wherein the heat sink device includes a metallic plate including cooling ribs.

26. A transmission unit in accordance with claim 4, wherein the control device includes a circuit board thermoconductively connected to the heat sink device.

27. A transmission unit in accordance with claim 4, wherein the heat insulating layer is made of plastic.

* * * * *